United States Patent
Izak (10) Patent No.: US 9,751,374 B2
(45) Date of Patent: Sep. 5, 2017

(54) VEHICLE AND A HEIGHT ADJUSTMENT SYSTEM FOR THE VEHICLE

(71) Applicant: GM GLOBAL TECHNOLOGY OPERATIONS LLC, Detroit, MI (US)

(72) Inventor: Robert G. Izak, Dryden, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/827,993

(22) Filed: Aug. 17, 2015

(65) Prior Publication Data

US 2016/0082802 A1    Mar. 24, 2016

Related U.S. Application Data

(60) Provisional application No. 62/053,395, filed on Sep. 22, 2014.

(51) Int. Cl.
*B60G 17/056* (2006.01)
*B60G 17/08* (2006.01)
(Continued)

(52) U.S. Cl.
CPC ............ *B60G 17/08* (2013.01); *B60G 3/20* (2013.01); *B60G 17/0152* (2013.01); *B60G 17/0272* (2013.01); *B60G 17/056* (2013.01); *B60G 17/0525* (2013.01); *B60G 17/0565* (2013.01); *B60G 21/067* (2013.01);
(Continued)

(58) Field of Classification Search
CPC .. B60G 17/00; B60G 17/0565; B60G 17/056; B60G 17/08; B60G 21/073; B60G 2202/32; B60G 2202/413; B60G 2500/30; B60G 2500/302; B60G 2500/32; B60G 2500/322; B60G 2500/324;
(Continued)

(56) References Cited

U.S. PATENT DOCUMENTS 3,331,601 A    7/1967 W. Riehl
3,643,970 A *  2/1972 Gauchet ............ B60G 17/005
                                            280/124.101
(Continued)

FOREIGN PATENT DOCUMENTS

CN    1184040 A    6/1998
DE    3708294 A1 * 9/1988   ....... B60G 17/01908
(Continued)

*Primary Examiner* — Barry Gooden, Jr.
(74) *Attorney, Agent, or Firm* — Quinn IP Law (57) ABSTRACT

A vehicle and a height adjustment system for the vehicle are disclosed. A valve includes a member movable between a first position operating first and second piston mechanisms to raise an end of the vehicle to a first height, a second position operating the first and second piston mechanisms to lower the end of the vehicle to a second height and a third position maintaining the end of the vehicle at one of the first height and the second height. A first fluid line extends between the first piston mechanism and the valve to fluidly connect the first piston mechanism and the valve. Additionally, a second fluid line extends between the second piston mechanism and the valve to fluidly connect the second piston mechanism and the valve. The first fluid line and the second fluid line are fluidly connected to the valve independently of each other.

21 Claims, 2 Drawing Sheets

(51) Int. Cl.
*B60G 21/073* (2006.01)
*B60G 17/052* (2006.01)
*B60G 17/015* (2006.01)
*B60G 17/027* (2006.01)
*B60G 21/067* (2006.01)
*B60G 3/20* (2006.01)

(52) U.S. Cl.
CPC ...... *B60G 21/073* (2013.01); *B60G 2200/144* (2013.01); *B60G 2202/312* (2013.01); *B60G 2202/32* (2013.01); *B60G 2202/413* (2013.01); *B60G 2202/414* (2013.01); *B60G 2202/415* (2013.01); *B60G 2204/8304* (2013.01); *B60G 2500/02* (2013.01); *B60G 2500/30* (2013.01); *B60G 2600/70* (2013.01)

(58) Field of Classification Search
CPC ............ B60G 17/0523; B60G 17/0525; B60G 17/0528; F16K 11/22
See application file for complete search history.

(56) References Cited

U.S. PATENT DOCUMENTS

| | | | | |
|---|---|---|---|---|
| 4,238,128 A * | 12/1980 | McKee | ............... | B60G 17/052 267/64.16 |
| 4,761,022 A * | 8/1988 | Ohashi | ............... | B60G 17/0162 280/5.504 |
| 5,009,451 A * | 4/1991 | Hayashi | ............. | B60G 17/0272 180/219 |
| 5,013,061 A | 5/1991 | Fujimura et al. | | |
| 5,022,501 A * | 6/1991 | Hayashi | ............. | B60G 17/0272 188/285 |
| 5,261,691 A * | 11/1993 | Laichinger | ......... | B60G 17/0277 280/5.501 |
| 5,401,053 A * | 3/1995 | Sahm | ................... | B60G 17/016 188/266.5 |
| 6,144,907 A * | 11/2000 | Shibuya | ............. | B60G 17/016 280/5.515 |
| 6,520,510 B1 * | 2/2003 | Germain | ............ | B60G 17/0152 280/124.106 |
| 8,672,334 B1 * | 3/2014 | Murakami | ............ | B60G 17/015 280/5.514 |
| 2005/0062239 A1 * | 3/2005 | Shore | ................... | B60G 17/005 280/6.157 |
| 2006/0175776 A1 * | 8/2006 | Christophel | ....... | B60G 17/0157 280/6.157 |
| 2007/0029711 A1 * | 2/2007 | Ehara | .................... | B60G 17/08 267/64.28 |
| 2007/0132197 A1 * | 6/2007 | Thies | ................. | B60G 17/0272 280/5.5 |
| 2007/0170680 A1 * | 7/2007 | Knaap | ................ | B60G 17/0152 280/124.106 |
| 2007/0241522 A1 * | 10/2007 | Tsai | .................... | B60G 17/0162 280/5.509 |
| 2008/0067770 A1 * | 3/2008 | Germain | ............ | B60G 17/0162 280/124.106 |
| 2009/0065314 A1 * | 3/2009 | Kondo | ................. | B60G 13/001 188/290 |
| 2009/0138156 A1 * | 5/2009 | Kesselgruber | ..... | B60G 17/0152 701/38 |
| 2009/0216403 A1 * | 8/2009 | Holbrook | ........... | B60G 17/0521 701/37 |
| 2009/0302555 A1 * | 12/2009 | Kesselgruber | ..... | B60G 17/0162 280/5.503 |
| 2010/0023211 A1 * | 1/2010 | Ammon | ............. | B60G 17/0165 701/37 |
| 2011/0221109 A1 * | 9/2011 | Hinouchi | ............. | B60G 15/063 267/221 |
| 2012/0104704 A1 * | 5/2012 | Nguyen | ................ | B60G 11/58 280/6.157 |
| 2012/0242057 A1 | 9/2012 | Glover et al. | | |
| 2012/0319376 A1 * | 12/2012 | Yu | ...................... | B60G 17/0162 280/124.154 |
| 2013/0020748 A1 * | 1/2013 | Kohlhauser | .......... | B60G 15/063 267/217 |
| 2013/0068550 A1 * | 3/2013 | Gale | ...................... | B60G 3/145 180/216 |
| 2013/0153310 A1 * | 6/2013 | Steffen | ................. | B62D 55/065 180/9.52 |
| 2013/0200578 A1 * | 8/2013 | Kohlhauser | .......... | B60G 15/063 280/5.51 |
| 2013/0221626 A1 * | 8/2013 | Lee | ........................ | B60G 17/08 280/5.514 |
| 2014/0260233 A1 * | 9/2014 | Giovanardi | ......... | F15B 13/0444 60/431 |
| 2014/0367930 A1 * | 12/2014 | Zeweke | ................ | B60G 17/00 280/5.514 |
| 2015/0028552 A1 * | 1/2015 | Seminara | ............ | B60G 17/018 280/6.157 |
| 2015/0210344 A1 * | 7/2015 | Kasuga | ................ | B62K 25/283 701/38 |
| 2015/0273970 A1 * | 10/2015 | Ishikawa | ............ | B60G 17/0152 701/37 |
| 2015/0290992 A1 * | 10/2015 | Mochizuki | ........... | B60G 15/062 280/5.514 |
| 2015/0367697 A1 * | 12/2015 | Bartolozzi | ........... | B60G 15/062 280/124.146 |
| 2015/0375592 A1 * | 12/2015 | Lannen | ................ | B60G 17/016 701/37 |
| 2016/0016451 A1 * | 1/2016 | Izak | ....................... | B60G 17/00 280/5.503 |
| 2016/0159191 A1 * | 6/2016 | Seminara | ............ | B60G 15/063 267/218 |
| 2016/0272034 A1 * | 9/2016 | Nedachi | ............. | B60G 17/0164 |
| 2016/0272035 A1 * | 9/2016 | Oishi | ................. | B60G 17/0525 |

FOREIGN PATENT DOCUMENTS

| | | | | |
|---|---|---|---|---|
| DE | 102009012581 A1 * | 11/2009 | ........... | B60G 17/018 |
| DE | WO-2011076302 A1 * | 6/2011 | ......... | B60G 17/0155 |
| GB | 2102355 A | 2/1983 | | |
| JP | 05131831 A * | 5/1993 | ......... | B60G 17/0277 |

* cited by examiner

VEHICLE AND A HEIGHT ADJUSTMENT SYSTEM FOR THE VEHICLE

CROSS-REFERENCE TO RELATED APPLICATIONS

This application claims the benefit of U.S. Provisional Application No. 62/053,395, filed on Sep. 22, 2014, which is hereby incorporated by reference in its entirety.

TECHNICAL FIELD

The present disclosure relates to a vehicle and a height adjustment system for the vehicle.

BACKGROUND

Some vehicles include a system to adjust the height of vehicle. For example, a front end of the vehicle can be adjusted to increase or decrease the amount of clearance from a road.

One type of system utilizes a single valve that selectively allows fluid back and forth to a pair of piston mechanisms which change the height of the vehicle. A single fluid line extends from the single valve, and this single fluid line splits between the single valve and the piston mechanisms. The fluid line splits into a first branch fluidly connected to one of the piston mechanisms and a second branch fluidly connected to another one of the piston mechanisms. In this configuration, fluid can flow between the first and second piston mechanisms through the first and second branches without entering or exiting the single valve which can reduce roll stiffness across an axle of the vehicle which can affect vehicle handling.

Another type of system utilizes two valves and two separate fluid lines. In this configuration, one of the fluid lines extends between one of the valves and one of the piston mechanisms and the other one of the fluid lines extends between the other one of the valves and the other one of the piston mechanisms. Therefore, one valve and one piston mechanism operate independently of the other valve and the other piston mechanism. If there is an interruption in one valve or the valves do not shut off at the same time, this can introduce a warp force on the vehicle, i.e., twist force on the vehicle, which can affect vehicle handling.

SUMMARY

The present disclosure provides a height adjustment system for a vehicle. The system includes a first piston mechanism adapted to be coupled to a first suspension assembly. The system also includes a second piston mechanism adapted to be coupled to a second suspension assembly. Furthermore, the system includes a valve. The valve includes a member movable between a first position operating the first and second piston mechanisms to raise an end of the vehicle to a first height, a second position operating the first and second piston mechanisms to lower the end of the vehicle to a second height and a third position maintaining the end of the vehicle at one of the first height and the second height. The system also includes a first fluid line extending between the first piston mechanism and the valve to fluidly connect the first piston mechanism and the valve. Additionally, the system includes a second fluid line extending between the second piston mechanism and the valve to fluidly connect the second piston mechanism and the valve. The first fluid line and the second fluid line are fluidly connected to the valve independently of each other.

The present disclosure also provides a vehicle including a body. The body includes an end. The vehicle further includes a first suspension assembly coupled to the body and a first piston mechanism coupled to the first suspension assembly. The vehicle also includes a second suspension assembly coupled to the body and a second piston mechanism coupled to the second suspension assembly. Additionally, the vehicle includes a valve. The valve includes a member movable between a first position operating the first and second piston mechanisms to raise the end to a first height, a second position operating the first and second piston mechanisms to lower the end to a second height and a third position maintaining the end at one of the first height and the second height. The vehicle also includes a first fluid line extending between the first piston mechanism and the valve to fluidly connect the first piston mechanism and the valve. The vehicle further includes a second fluid line extending between the second piston mechanism and the valve to fluidly connect the second piston mechanism and the valve. The first fluid line and the second fluid line are fluidly connected to the valve independently of each other.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that terms such as "above", "below", "upward", "up", "downward", "down", "top", "bottom", "left", "right", "back", "forth", etc., are used descriptively for the figures, and do not represent limitations on the scope of the disclosure, as defined by the appended claims. Furthermore, the term "substantially" can refer to a slight imprecision or slight variance of a condition, quantity, value, or dimension, etc., some of which that are within manufacturing variance or tolerance ranges that can be subject to human error during installation.

Figure 1:
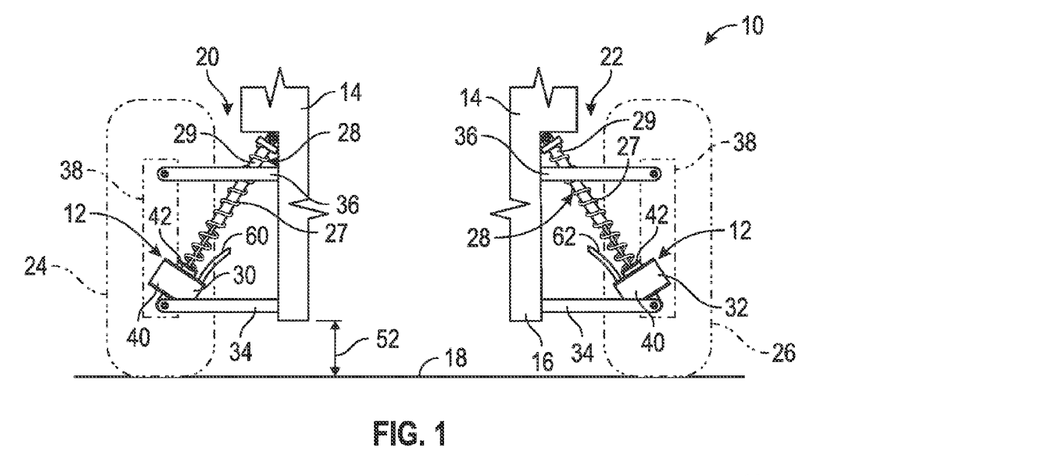
FIG. 1 is a schematic fragmentary illustration of a vehicle, with a body of the vehicle spaced a first height from a road surface.
Figure 2:
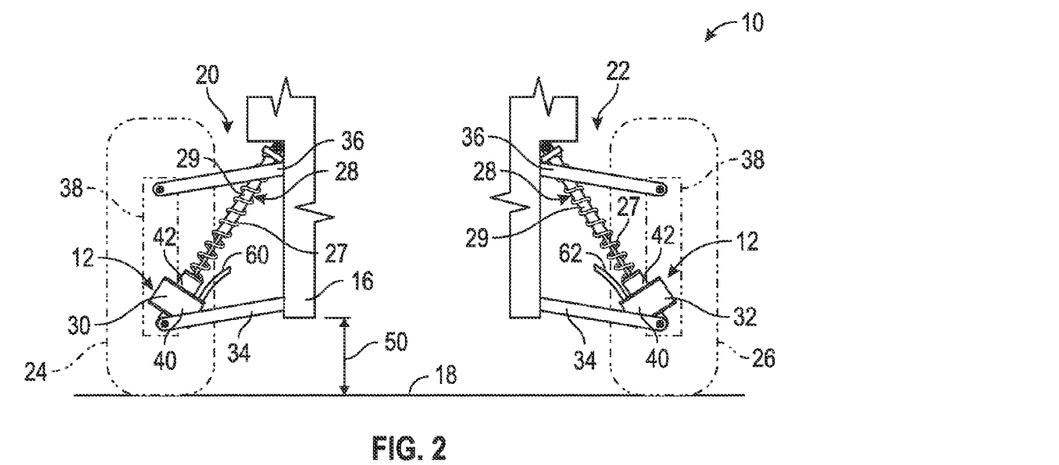
FIG. 2 is a schematic fragmentary illustration of the vehicle from FIG. 1, with the body of the vehicle spaced a second height from the road surface.

Referring to the Figures, wherein like numerals indicate like or corresponding parts throughout the several views, a vehicle 10 and a height adjustment system 12 for the vehicle 10 are generally shown in FIGS. 1 and 2.

The vehicle 10 can be an automotive vehicle, such as, a car, a sports car, a truck, etc. Furthermore, the vehicle 10 can be a hybrid vehicle utilizing an internal combustion engine and one or more motor-generators. Additionally, the vehicle 10 can be an electric vehicle utilizing one or more motor-generators and eliminating the internal combustion engine. As another example, the vehicle 10 can be a vehicle utilizing the internal combustion engine and eliminating the motor-generator(s). It is to be appreciated that the vehicle 10 can alternatively be a non-automotive vehicle.

Referring to FIGS. 1 and 2, the vehicle 10 can include a body 14. The body 14 can include an end 16, such as a front end and a rear end spaced from each other along a length of the body 14. For example, the front end can be proximal to the headlights of the vehicle 10 and the rear end can be proximal to the taillights of the vehicle 10. The body 14 can include one or more of: an axle, such as a front axle or a rear axle, a chassis, a structure, a support structure, a frame, a subframe, a brace, a panel, an outer skin, etc. The body 14 can be any suitable configuration. Generally, the body 14 is spaced from a road surface 18 or the ground. As discussed in detail below, the height of the body 14 relative to the road surface 18 can be adjusted.

The vehicle 10 can also include a suspension system that supports at least part of the body 14. Additionally, the body 14 can include any component of a sprung mass of the vehicle 10, including the structure, the frame, the subframe, the chassis, the outer skin, or any load-bearing component which is supported by the suspension system. The suspension system can dampen movement of the body 14 as the vehicle 10 travels over the road surface 18 to provide a smoother ride.

The suspension system can include a first suspension assembly 20, which in one embodiment can be a first front suspension assembly. The suspension system can also include a second suspension assembly 22, which in one embodiment can be a second front suspension assembly. The first suspension assembly 20 can be coupled to the body 14 and a first wheel 24, such as in one embodiment, a first front wheel, and the second suspension assembly 22 can be coupled to the body 14 and a second wheel 26, such as in one embodiment, a second front wheel.

The first and second suspension assemblies 20, 22 can each include a coil-shock device 28 or any other type of suspension to dampen movement of the body 14 as the vehicle 10 travels over the road surface 18. The coil-shock devices 28 can each include a coil spring 27 and a cylinder-piston-rod mechanism 29. The coil spring 27 surrounds respective cylinder-piston-rod mechanism 29. The first and second suspension assemblies 20, 22 can include other components not specifically discussed herein.

Referring to FIGS. 1 and 2, the height adjustment system includes a first piston mechanism 30 adapted to be coupled to the first suspension assembly 20 and a second piston mechanism 32 adapted to be coupled to the second suspension assembly 22. The first and second piston mechanisms 30, 32 are utilized to change the height of the vehicle 10, such as for example, the end 16 of the vehicle 10 relative to the road surface 18. In certain embodiments, the first and second piston mechanisms 30, 32 can be secured to respective lower control arms 34. It is to be appreciated that the first and second piston mechanism 30, 32 can be secured to the vehicle 10 at other locations. The height adjustment system 12 can change the height of the vehicle 10 relative to the road surface 18, and thus change the height of the end 16 of the body 14, such as in one embodiment, change the height of the front end of the body 14. The height adjustment system 12 can minimize any affect on vehicle handling. It is to also be appreciated that the vehicle 10 can include other components, such as upper control arms 36, a wheel knuckle 38 (shown in phantom lines in FIGS. 1 and 2) that couples respective wheels 24, 26 to respective upper and lower control arms 36, 34, etc.

The first and second piston mechanisms 30, 32 can each include a housing 40 and a piston 42 movable relative to the housing 40. Movement of the pistons 42 changes the height of the end 16 of the body 14. Specifically, movement of the pistons 42 can move up and down the respective first and second suspension assemblies 20, 22, and more specifically, move up and down the coil spring 27 of the coil-over shock devices 28. Therefore, the pistons 42 can move up and down relative to respective first and second suspension assemblies 20, 22. One of the pistons 42 can move the coil spring 27 of the first suspension assembly 20 and the other one of the pistons 42 can move the coil spring 27 of the second suspension assembly 22, and this movement changes the height of the end 16 of the body 14.

The housing 40 can define a chamber in which fluid 44 (represented by arrows 44 in FIGS. 3 and 4) can enter and exit to change the position of the piston 42. Therefore, the first and second piston mechanisms 30, 32 can be hydraulically controlled. The fluid 44 can be any suitable fluid 44, such as hydraulic fluid, oil, etc.

Figure 3:
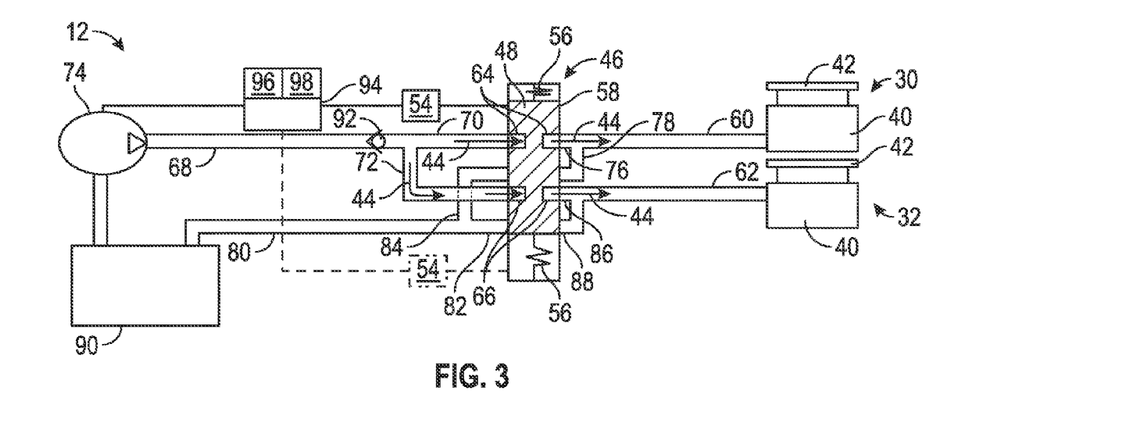
FIG. 3 is a schematic illustration of a valve including a member in a first position to direct a fluid to a first piston mechanism and a second piston mechanism.
Figure 4:
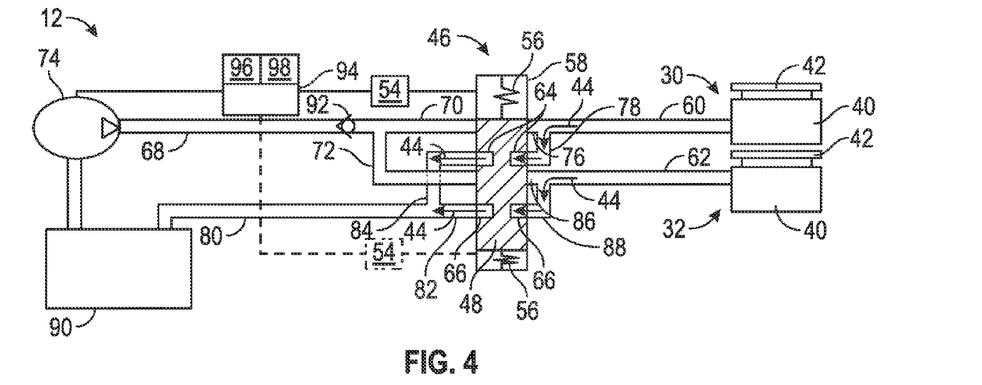
FIG. 4 is a schematic illustration of the member of the valve in a second position to direct the fluid to a reservoir.
Figure 5:
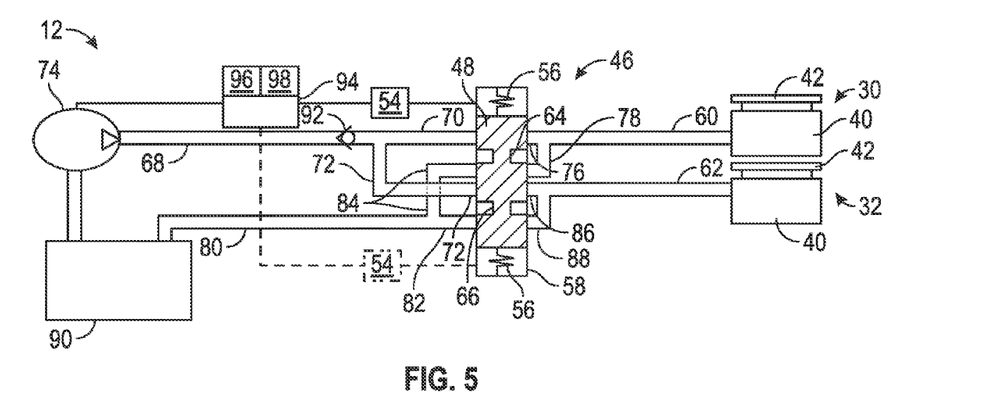
FIG. 5 is a schematic illustration of the member of the valve in a third position to prevent fluid flow through the valve.
Figure 6:
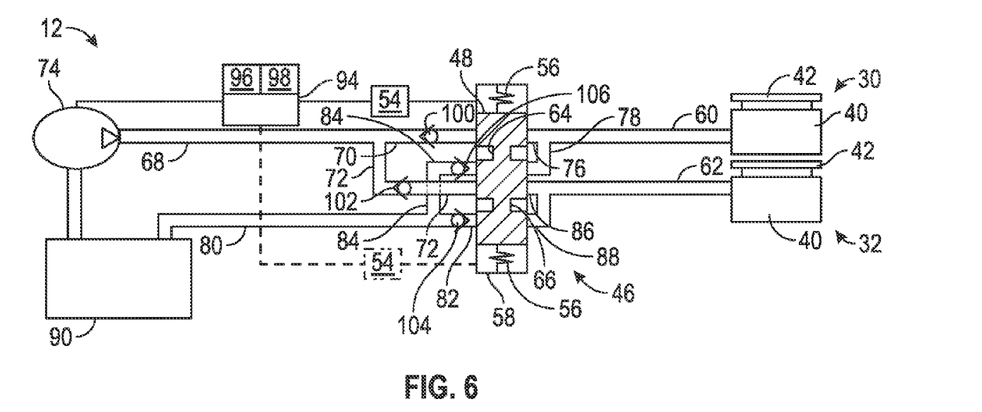
FIG. 6 is a schematic illustration of an alternative location of a plurality of one-way valves.

As shown in FIGS. 3-6, the height adjustment system 12 includes a valve 46. The valve 46 includes a member 48 movable between a first position operating the first and second piston mechanisms 30, 32 to raise the end 16 of the vehicle 10 to a first height 50, a second position operating the first and second piston mechanisms 30, 32 to lower the end 16 of the vehicle 10 to a second height 52 and a third position maintaining the end 16 of the vehicle 10 at one of the first height 50 and the second height 52. The first height 50 is shown in FIG. 2 and the second height 52 is shown in FIG. 1. Furthermore, the first position of the member 48 is shown in FIG. 3. The second position of the member 48 is shown in FIG. 4. The third position of the member 48 is shown in FIGS. 5 and 6.

Referring to FIGS. 3-6, the valve 46 can further include an actuator 54 selectively energized to move the member 48 to one of the first position and the second position. In this embodiment, a single actuator 54 can move the member to the first and second positions. In other embodiments, the actuator 54 can be defined as a plurality of actuators 54. Therefore, in this other embodiment, one of the actuators 54 can be energized to move the member 48 to the first position and another one of the actuators 54 can be energized to move the member 48 to the second position. One of the actuators 54 is shown in phantom lines to illustrate the optional plurality of actuators 54, and the evenly spaced dashed lines extending from the optional actuator 54 indicates communication between the optional actuator 54 and the valve 46 and the optional actuator 54 and a controller 94 (the controller 94 is discussed further below). The location of the actuator(s) 54 in the Figures is illustrative only and can be in any suitable location.

In certain embodiments, the valve 46 can further include a plurality of biasing members 56. The biasing members 56 continuously bias the member 48 to the third position. Therefore, when the actuator 54 is de-energized, one of the biasing members 56 at least partially decompresses to move the member 48 back to the third position. Utilizing the biasing members 56 allows the actuator 54 to be de-energized in certain situations which can save energy. In other words, the actuator(s) 54 do not have to be energized all the time. In one embodiment, the biasing members 56 are coil springs. It is to be appreciated that any suitable springs or biasing members can be utilized.

The valve 46 can include a casing 58. The member 48 is movable inside the casing 58 between the first, second and third positions. Also, the biasing members 56 can be disposed inside the casing 58. One example of a suitable type of valve 46 is a spool valve 46. It is to be appreciated that any suitable type of valve 46 can be utilized and the spool valve 46 is for illustrative purposes only.

Referring to FIGS. 3-6, the height adjustment system 12 includes a first fluid line 60 extending between the first piston mechanism 30 and the valve 46 to fluidly connect the first piston mechanism 30 and the valve 46. Furthermore, the height adjustment system 12 includes a second fluid line 62 extending between the second piston mechanism 32 and the valve 46 to fluidly connect the second piston mechanism 32 and the valve 46. The first fluid line 60 and the second fluid line 62 are fluidly connected to the valve 46 independently of each other. In other words, the first fluid line 60 and the second fluid line 62 are separate from each other. Generally, the first and second fluid lines 60, 62 are attached to the casing 58 of the valve 46 in a spaced relationship. Therefore, the first and second fluid lines 60, 62 are attached to the casing 58 independently of each other. Additionally, the first fluid line 60 is attached to the housing 40 of the first piston mechanism 30 and the second fluid line 62 is attached to the housing 40 of the second piston mechanism 32.

Continuing with FIGS. 3-6, the member 48 can define a first path 64 and a second path 66 spaced from each other. As discussed above, the member 48 is movable. As such, the first and second paths 64, 66 correspondingly move as the member 48 moves between the positions (compare FIGS. 3-6). For example, generally, the first path 64 aligns with the first fluid line 60 when the member 48 is in the first position and the second path 66 aligns with the second fluid line 62 when the member 48 is in the first position. Details of the movement of the member 48 are discussed further below.

Again continuing with FIGS. 3-6, the height adjustment system 12 can include an inlet line 68 extending to the valve 46 and fluidly connected to the first and second fluid lines 60, 62 through the first and second paths 64, 66 when the member 48 is in the first position (the first position is shown in FIG. 3). Generally, the inlet line 68 is separated from the first and second fluid lines 60, 62 by the valve 46. When the member 48 is in the second position or the third position, the first and second paths 64, 66 do not fluidly connect the inlet line 68 with the first and second fluid lines 60, 62. In other words, when the member 48 is in the second or third positions, the inlet line 68 and the first and second fluid lines 60, 62 are separated, i.e., no fluid communication is allowed between the inlet line 68 and the first and second fluid lines 60, 62. Therefore, the first and second paths 64, 66 are spaced from the inlet line 68 when the member 48 is in the second or third positions. Said differently, the first and second paths 64, 66 of the member 48 are offset from the inlet line 68 when the member 48 is in the second or third positions such that fluid communication between the inlet line 68 and the first and second fluid lines 60, 62 is prevented.

In certain embodiments, the inlet line 68 splits into a first segment 70 and a second segment 72. The first segment 70 of the inlet line 68 and the first fluid line 60 are fluidly connected through the first path 64 when the member 48 is in the first position (see FIG. 3). Furthermore, the second segment 72 of the inlet line 68 and the second fluid line 62 are fluidly connected through the second path 66 when the member 48 is in the first position (see FIG. 3). In certain embodiments, the first and second segments 70, 72 of the inlet line 68 are each attached to the casing 58 of the valve 46. For example, the first and second segments 70, 72 of the inlet line 68 can be attached to the casing 58 in a spaced relationship from each other.

Continuing with FIGS. 3-6, the height adjustment system 12 can include a pump 74 selectively actuated to deliver the fluid 44 to the first and second piston mechanisms 30, 32. The inlet line 68 extends between the pump 74 and the valve 46 to fluidly connect the pump 74 and the valve 46. Therefore, referring to FIG. 3, when the member 48 is in the first position and the pump 74 is actuated, fluid 44 can flow through the inlet line 68, through the first and second paths 64, 66, through the first and second fluid lines 60, 62 into the first and second piston mechanisms 30, 32 which causes respective pistons 42 to move outwardly from respective housings 40 which moves the end 16 of the body 14 of the vehicle 10 away from the road surface 18.

In certain embodiments, the first fluid line 60 splits into a first portion 76 and a second portion 78. The first portion 76 of the first fluid line 60 and the first segment 70 of the inlet line 68 are fluidly connected through the first path 64 when the member 48 is in the first position (see FIG. 3). In certain embodiments, the first and second portions 76, 78 of the first fluid line 60 are each attached to the casing 58 of the valve 46. For example, the first and second portions 76, 78 of the first fluid line 60 can be attached to the casing 58 in a spaced relationship from each other.

Referring to FIGS. 3-6, the height adjustment system 12 can include an outlet line 80 extending to the valve 46 and fluidly connected to the first and second fluid lines 60, 62 through the first and second paths 64, 66 when the member 48 is in the second position (the second position is shown in FIG. 4). Generally, the outlet line 80 is separated from the first and second fluid lines 60, 62 by the valve 46. When the member 48 is in the first position or the third position, the first and second paths 64, 66 do not fluidly connect the outlet line 80 with the first and second fluid lines 60, 62. In other words, when the member 48 is in the first or third positions, the outlet line 80 and the first and second fluid lines 60, 62 are separated, i.e., no fluid communication is allowed between the outlet line 80 and the first and second fluid lines 60, 62. Therefore, the first and second paths 64, 66 are spaced from the outlet line 80 when the member 48 is in the first or third position. Said differently, the first and second paths 64, 66 of the member 48 are offset from the outlet line 80 when the member 48 is in the first or third positions such that fluid communication between the outlet line 80 and the first and second fluid lines 60, 62 is prevented.

In certain embodiments, the outlet line 80 splits into a first segment 82 and a second segment 84. The first segment 82 of the outlet line 80 and the second fluid line 62 are fluidly connected through the second path 66 when the member 48 is in the second position (see FIG. 4). Generally, the second segment 84 of the outlet line 80 and the first fluid line 60 are fluidly connected through the first path 64 when the member 48 is in the second position (see FIG. 4). More specifically, the second segment 84 of the outlet line 80 and the second portion 78 of the first fluid line 60 are fluidly connected through the first path 64 when the member 48 is in the second position. In certain embodiments, the first and second segments 82, 84 of the outlet line 80 are each attached to the casing 58 of the valve 46. For example, the first and second segments 82, 84 of the outlet line 80 can be attached to the casing 58 in a spaced relationship from each other.

Furthermore, in certain embodiments, the second fluid line 62 splits into a first portion 86 and a second portion 88. The second segment 72 of the inlet line 68 and the first portion 86 of the second fluid line 62 are fluidly connected through the second path 66 when the member 48 is in the first position (see FIG. 3). Furthermore, the second portion 88 of the second fluid line 62 and the first segment 82 of the outlet line 80 are fluidly connected through the second path 66 when the member 48 is in the second position (see FIG. 4). In certain embodiments, the first and second portions 86, 88 of the second fluid line 62 are each attached to the casing 58 of the valve 46. For example, the first and second portions 86, 88 of the second fluid line 62 can be attached to the casing 58 in a spaced relationship from each other.

The height adjustment system 12 can also include a reservoir 90 selectively receiving the fluid 44 from the first and second piston mechanisms 30, 32. The outlet line 80 extends between the valve 46 and the reservoir 90 to fluidly connect the valve 46 and the reservoir 90. Therefore, referring to FIG. 4, when the member 48 is in the second position, fluid 44 can flow out of the first and second piston mechanisms 30, 32, through the first and second fluid lines 60, 62, through the first and second paths 64, 66, through the outlet line 80 into the reservoir 90, which causes respective pistons 42 of the first and second piston mechanisms 30, 32 to move inwardly toward respective housings 40, which moves the end 16 of the body 14 of the vehicle 10 toward the road surface 18. As the fluid 44 exits the first and second piston mechanisms 30, 32 when the member 48 is in the second position, the weight of the body 14 or the vehicle 10 causes the pistons 42 to move into respective housings 40. Optionally, the reservoir 90 can be pressurized, and thus, the reservoir 90 can include a biasing member or biasing mechanism to pressurize the reservoir 90.

When the pump 74 is actuated and the member 48 is in the first position, the inlet line 68 and the first and second fluid lines 60, 62 are pressurized to pump the fluid 44 into the first and second piston mechanisms 30, 32 at the same time, i.e., simultaneously, which moves each of the pistons 42 simultaneously. As described herein, a single valve 46 is utilized, and the first and second fluid lines 60, 62 are attached to the single valve 46 separately to eliminate directly cross-connecting these lines 60, 62 without entering the valve 46, and thus, minimizing the reduction of the roll stiffness across the axle of the vehicle 10 (as discussed in the background section, reducing roll stiffness can affect vehicle handling). Utilizing this height adjustment system 12 can reduce the number of sensors or system pre-checks, which can reduce costs.

Briefly, the different positions are set forth in detail below. Referring to FIGS. 2 and 3, when it is desired to raise the end 16 of the body 14, the pump 74 is actuated and the actuator 54 of the valve 46 is actuated to move the member 48 to the first position. When the member 48 is in the first position, the first path 64 of the member 48 aligns with the first segment 70 of the inlet line 68 and the first portion 76 of the first fluid line 60, and additionally, the second path 66 aligns with the second segment 72 of the inlet line 68 and the first portion 86 of the second fluid line 62. Fluid 44 is pumped through the inlet line 68 from the pump 74, through the first and second segments 70, 72 of the inlet lines 68, through respective first and second paths 64, 66, through the first portions 76, 86 of the first and second fluid lines 60, 62 respectively, through the first and second fluid lines 60, 62 and into respective housings 40 of the first and second piston mechanisms 30, 32 which causes the pistons 42 of the first and second piston mechanisms 30, 32 to move outwardly from respective housings 40 to raise the end 16 of the vehicle 10.

When the desired height of the end 16 of the vehicle 10 is reached, i.e., the desired height of the pistons 42 relative to respective housings 40 of the first and second piston mechanisms 30, 32 are reached, the actuator 54 is de-energized and the pump 74 is de-activated. At least one of the biasing members 56 moves the member 48 from the first position to the third position. The first and second paths 64, 66 are spaced from the inlet line 68 and the outlet line 80 when the member 48 is in the third position (see FIGS. 5 and 6). More specifically, the first and second paths 64, 66 are spaced from all of the lines 60, 62, 68, 80 to disconnect fluid communication through the valve 46, i.e., fluid communication is prevented through the valve 46. Therefore, the end 16 of the body 14 remains in its current position.

Referring to FIGS. 1 and 4, when it is desired to lower the end 16 of the body 14, the actuator 54 of the valve 46 is actuated to move the member 48 to the second position. When the member 48 is in the second position, the first path 64 aligns with the second segment 84 of the outlet line 80 and the second portion 78 of the first fluid line 60, and additionally, the second path 66 aligns with the first segment 82 of the outlet line 80 and the second portion 88 of the second fluid line 62. Fluid 44 flows out of the first and second piston mechanisms 30, 32 due to the weight of the vehicle 10 pushing the pistons 42 back into respective housings 40. Therefore, the fluid 44 flows out of the first and second piston mechanisms 30, 32 into the first and second fluid lines 60, 62, through the second portions 78, 88 of the first and second fluid lines 60, 62, through respective first and second paths 64, 66, through respective first and second segments 82, 84 of the outlet line 80, though the outlet line 80 and into the reservoir 90 which causes the pistons 42 of the first and second piston mechanisms 30, 32 to move inwardly toward respective housings 40 to lower the end 16 of the vehicle 10. As suggested above, the pump 74 is not actuated when lowering the vehicle 10.

As shown in FIGS. 5 and 6, when the desired height of the end 16 of the vehicle 10 is reached (which for illustrative purposes is the lowered position), i.e., the desired height of the pistons 42 of the first and second piston mechanisms 30, 32 are reached, the actuator 54 is de-energized. At least one of the biasing members 56 moves the member 48 from the second position to the third position. The first and second paths 64, 66 are spaced from the inlet line 68 and the outlet line 80 when the member 48 is in the third position. More specifically, the first and second paths 64, 66 are spaced from all of the lines 60, 62, 68, 80 to disconnect fluid communication through the valve 46, i.e., fluid communication is prevented through the valve 46. Therefore, the end 16 of the body 14 remains in its current position.

In certain embodiments, the height adjustment system 12 can include a one-way valve 92 disposed along the inlet line 68 upstream from the split into the first and second segments 70, 72 of the inlet line 68 which prevents backflow to the pump 74. In other words, the one-way valve 92 is disposed between the pump 74 and the split at the first and second segments 70, 72 of the inlet line 68. Therefore, the one-way valve 92 prevents the fluid 44 from backing up the inlet line 68 from the valve 46 into the pump 74. The first and second piston mechanisms 30, 32 can be fluidly connected when the member 48 is in the first position, without the fluid 44 backing up into the pump 74 due to the one-way valve 92, which can minimize a warp force on the vehicle 10, i.e., twist force on the vehicle 10, i.e., side to side force difference in the vehicle 10. Therefore, minimizing the warp force can improve vehicle handling.

The height adjustment system 12 can also include a controller 94 in communication with the actuator 54 to selectively energize the actuator 54. The controller 94 can control the actuator 54 to move the member 48 to the desired position which causes the first and second piston mechanisms 30, 32 to change the height of the end 16 of the body 14 relative to the road surface 18. Optionally, the controller 94 can also monitor the amount of current supplied to the actuator 54 to monitor the position of the member 48. Alternatively, a position sensor can be utilized to monitor the position of the member 48. The controller 94 can also be in communication with the pump 74 to selectively actuate the pump 74. The controller 94 can be part of an electronic control module. The controller 94 includes a processor 96 and a memory 98 on which is recorded instructions for controlling the actuator 54, the pump 74, any desired sensors, the valve 46, etc. The controller 94 can control other components of the vehicle 10 not specifically discussed herein and/or be in electrical communication with another controller of the vehicle 10. For example, another controller 94 can be utilized to control the pump 74 and the individual controllers 94 can optionally communicate with each other. Furthermore, when utilizing more than one actuator 54, one controller 94 can communicate with both actuators 54, or alternatively, one controller 94 can communicate with one actuator 54 and another controller 94 can communication with another actuator 54 and each controller 94 can optionally communicate with each other.

The controller 94 is configured to execute the instructions from the memory 98, via the processor 96. For example, the controller 94 can be a host machine or distributed system, e.g., a computer such as a digital computer or microcomputer, acting as a vehicle control module, and/or as a proportional-integral-derivative (PID) controller device having a processor, and, as the memory 98, tangible, non-transitory computer-readable memory such as read-only memory (ROM) or flash memory. The controller 94 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller 94 can include all software, hardware, memory 98, algorithms, connections, sensors, etc., necessary to control the actuator(s) 54, the pump 74, one or more sensors, the valve 46, etc. As such, a control method operative to control the actuator(s) 54, the pump 74, sensor(s), the valve 46, etc. can be embodied as software or firmware associated with the controller 94. It is to be appreciated that the controller 94 can also include any device capable of analyzing data from various sensors, comparing data, making the necessary decisions required to control and monitor the actuator(s) 54, the pump 74, the sensor(s), the valve 46, etc.

As an alternative, the one-way valve 92 can be changed. Specifically, FIG. 6 illustrates utilizing four one-way valves 100, 102, 104, 106 instead of a single one-way valve 92 as illustrated in FIGS. 3-5. Common features between the embodiments will have the same reference numbers and will not be re-discussed. As shown in FIG. 6, the height adjustment system 12 can include a first one-way valve 100 disposed along the first segment 70 of the inlet line 68 between the pump 74 and the valve 46 which prevents backflow to the pump 74. Furthermore, the height adjustment system 12 can include a second one-way valve 102 disposed along the second segment 72 of the inlet line 68 between the pump 74 and the valve 46 which also prevents backflow to the pump 74. Additionally, the height adjustment system 12 can include a third one-way valve 104 disposed along the first segment 82 of the outlet line 80 between the valve 46 and the reservoir 90 which prevents backflow to the valve 46. The height adjustment system 12 can also include a fourth one-way valve 106 disposed along the second segment 84 of the outlet line 80 between the valve 46 and the reservoir 90 which prevents backflow to the valve 46. Therefore, the first and second one-way valves 100, 102 are disposed downstream from the split along the inlet line 68, and the third and fourth one-way valves 104, 106 are disposed downstream from the split along the outlet line 80. Utilizing these four one-way valves 92 further assists in minimizing cross-flow of the fluid 44 between the first and second piston mechanisms 30, 32 which can correlate to the left and right sides of the end 16 of the vehicle 10, thus reducing any affect on vehicle handling. In addition, the pressure between the first and second piston mechanisms 30, 32 can be equalized by selectively moving the member 48 to the first and second positions which can minimize the warp force on the vehicle 10.

The height adjustment system 12 can be utilized to raise the front end of the vehicle 10 or the rear end of the vehicle 10. In another embodiment, the height adjustment system 12 can raise the front end and the rear end of the vehicle 10. In this embodiment, for a four-wheeled vehicle, four piston mechanisms are utilized, with one piston mechanism disposed proximal to respective wheels. For example, with this embodiment, one valve 46 can be utilized for the piston mechanisms with the front suspension assembly and another valve 46 can be utilized for the piston mechanisms with the rear suspension assembly.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A height adjustment system for a vehicle, the system comprising:
 a first piston mechanism adapted to be coupled to a first suspension assembly;
 a second piston mechanism adapted to be coupled to a second suspension assembly;
 a valve including a member movable between a first position operating the first and second piston mechanisms to raise an end of the vehicle to a first height, a second position operating the first and second piston mechanisms to lower the end of the vehicle to a second height, and a third position maintaining the end of the vehicle at one of the first height and the second height;
 a first fluid line extending between the first piston mechanism and the valve to fluidly connect the first piston mechanism and the valve; and a second fluid line extending between the second piston mechanism and the valve to fluidly connect the second piston mechanism and the valve, with the first fluid line and the second fluid line fluidly connected to the valve independently of each other;

an inlet line extending to the valve and the inlet line splits into a first segment and a second segment;

an outlet line extending to the valve and the outlet line splits into a first segment and a second segment.

2. The system as set forth in claim 1 wherein the valve includes an actuator selectively energized to move the member to one of the first position and the second position; and wherein the valve includes a plurality of biasing members continuously biasing the member to the third position.

3. The system as set forth in claim 2 further including a controller in communication with the actuator to selectively energize the actuator.

4. The system as set forth in claim 1 further including a pump selectively actuated to deliver a fluid to the first and second piston mechanisms, with the inlet line extending between the pump and the valve to fluidly connect the pump and the valve, and further including a reservoir selectively receiving the fluid from the first and second piston mechanisms, with the outlet line extending between the valve and the reservoir to fluidly connect the valve and the reservoir.

5. The system as set forth in claim 4 further including a one-way valve disposed along the inlet line upstream from the split into the first and second segments of the inlet line which prevents backflow to the pump.

6. The system as set forth in claim 4 further including:
a first one-way valve disposed along the first segment of the inlet line between the pump and the valve which prevents backflow to the pump;
a second one-way valve disposed along the second segment of the inlet line between the pump and the valve which prevents backflow to the pump;
a third one-way valve disposed along the first segment of the outlet line between the valve and the reservoir which prevents backflow to the valve; and
a fourth one-way valve disposed along the second segment of the outlet line between the valve and the reservoir which prevents backflow to the valve.

7. The system as set forth in claim 1 wherein the member defines a first path and a second path spaced from each other, with the first path aligning with the first fluid line when the member is in the first position and the second path aligning with the second fluid line when the member is in the first position.

8. The system as set forth in claim 7 wherein the inlet line is fluidly connected to the first and second fluid lines through the first and second paths when the member is in the first position; and wherein the first and second paths are spaced from the inlet line when the member is in the third position.

9. The system as set forth in claim 8 wherein the first segment of the inlet line and the first fluid line are fluidly connected through the first path when the member is in the first position, and the second segment of the inlet line and the second fluid line fluidly connected through the second path when the member is in the first position.

10. The system as set forth in claim 9 wherein the first fluid line splits into a first portion and a second portion, with the first portion of the first fluid line and the first segment of the inlet line fluidly connected through the first path when the member is in the first position.

11. The system as set forth in claim 10 wherein the first segment of the outlet line and the second fluid line are fluidly connected through the second path when the member is in the second position, and the second segment of the outlet line and the second portion of the first fluid line are fluidly connected through the first path when the member is in the second position.

12. The system as set forth in claim 7 wherein the outlet line is fluidly connected to the first and second fluid lines through the first and second paths when the member is in the second position; and wherein the first and second paths are spaced from the outlet line when the member is in the third position.

13. The system as set forth in claim 12 wherein the first segment of the outlet line and the second fluid line are fluidly connected through the second path when the member is in the second position, and the second segment of the outlet line and the first fluid line are fluidly connected through the first path when the member is in the second position.

14. The system as set forth in claim 13 wherein the second fluid line splits into a first portion and a second portion, with the second portion of the second fluid line and the first segment of the outlet line fluidly connected through the second path when the member is in the second position.

15. The system as set forth in claim 14 wherein the first segment of the inlet line and the first fluid line are fluidly connected through the first path when the member is in the first position, and the second segment of the inlet line and the first portion of the second fluid line are fluidly connected through the second path when the member is in the first position.

16. A vehicle comprising:
a body including an end;
a first suspension assembly coupled to the body;
a first piston mechanism coupled to the first suspension assembly;
a second suspension assembly coupled to the body;
a second piston mechanism coupled to the second suspension assembly;
a valve including a member movable between a first position operating the first and second piston mechanisms to raise the end to a first height, a second position operating the first and second piston mechanisms to lower the end to a second height, and a third position maintaining the end at one of the first height and the second height;
a first fluid line extending between the first piston mechanism and the valve to fluidly connect the first piston mechanism and the valve; and
a second fluid line extending between the second piston mechanism and the valve to fluidly connect the second piston mechanism and the valve, with the first fluid line and the second fluid line fluidly connected to the valve independently of each other;
wherein the member defines a first path and a second path spaced from each other, with the first path aligning with the first fluid line when the member is in the first position and the second path aligning with the second fluid line when the member is in the first position;
an inlet line extending to the valve and fluidly connected to the first and second fluid lines through the first and second paths when the member is in the first position;
an outlet line extending to the valve and fluidly connected to the first and second fluid lines through the first and second paths when the member is in the second position;
wherein the first and second paths are spaced from the inlet line and the outlet line when the member is in the third position;

wherein the inlet line splits into a first segment and a second segment, with the first segment of the inlet line and the first fluid line fluidly connected through the first path when the member is in the first position, and the second segment of the inlet line and the second fluid line fluidly connected through the second path when the member is in the first position;

wherein the outlet line splits into a first segment and a second segment, with the first segment of the outlet line and the second fluid line fluidly connected through the second path when the member is in the second position, and the second segment of the outlet line and the first fluid line fluidly connected through the first path when the member is in the second position.

17. The vehicle as set forth in claim 16 wherein:

the first fluid line splits into a first portion and a second portion, with the first portion of the first fluid line and the first segment of the inlet line fluidly connected through the first path when the member is in the first position, and the second portion of the first fluid line and the second segment of the outlet line fluidly connected through the first path when the member is in the second position; and the second fluid line splits into a first portion and a second portion, with the first portion of the second fluid line and the second segment of the inlet line fluidly connected through the second path when the member is in the first position, and the second portion of the second fluid line and the first segment of the outlet line fluidly connected through the second path when the member is in the second position.

18. The vehicle as set forth in claim 16 further including a pump selectively actuated to deliver a fluid to the first and second piston mechanisms, with the inlet line extending between the pump and the valve to fluidly connect the pump and the valve, and further including a reservoir selectively receiving the fluid from the first and second piston mechanisms, with the outlet line extending between the valve and the reservoir to fluidly connect the valve and the reservoir.

19. A height adjustment system for a vehicle, the system comprising:

a first piston mechanism adapted to be coupled to a first suspension assembly;

a second piston mechanism adapted to be coupled to a second suspension assembly;

a valve including a member movable between a first position operating the first and second piston mechanisms to raise an end of the vehicle to a first height, a second position operating the first and second piston mechanisms to lower the end of the vehicle to a second height, and a third position maintaining the end of the vehicle at one of the first height and the second height;

a first fluid line extending between the first piston mechanism and the valve to fluidly connect the first piston mechanism and the valve; and a second fluid line extending between the second piston mechanism and the valve to fluidly connect the second piston mechanism and the valve, with the first fluid line and the second fluid line fluidly connected to the valve independently of each other;

wherein the member defines a first path and a second path spaced from each other;

an outlet line extending to the valve and fluidly connected to the first and second fluid lines through the first and second paths when the member is in the second position;

wherein the outlet line splits into a first segment and a second segment, with the first segment of the outlet line and the second fluid line fluidly connected through the second path when the member is in the second position.

20. The system as set forth in claim 19 wherein:

the first and second paths are spaced from the outlet line when the member is in the third position; and the second segment of the outlet line and the first fluid line are fluidly connected through the first path when the member is in the second position.

21. The system as set forth in claim 19 wherein the second fluid line splits into a first portion and a second portion, with the second portion of the second fluid line and the first segment of the outlet line fluidly connected through the second path when the member is in the second position.

* * * * *